United States Patent [19]

Renaud

[11] Patent Number: 4,560,052
[45] Date of Patent: Dec. 24, 1985

[54] CLUTCH RELEASE DEVICE

[75] Inventor: Pierre Renaud, Le Plessis-Trevise, France

[73] Assignee: Valeo, Paris, France

[21] Appl. No.: 385,821

[22] Filed: Jun. 7, 1982

[30] Foreign Application Priority Data

Jun. 9, 1981 [FR] France ................. 81 11272

[51] Int. Cl.[4] .................................... F16D 23/14
[52] U.S. Cl. ................. 192/98; 192/99 S; 192/101
[58] Field of Search ........... 192/98, 99 A, 99 S, 192/101; 188/72.9; 74/519

[56] References Cited

U.S. PATENT DOCUMENTS

| 2,260,770 | 10/1941 | Brownlee | 192/93 |
| 2,962,914 | 12/1960 | Peras | 74/477 |
| 4,228,882 | 10/1980 | Huber et al. | 192/98 |
| 4,276,974 | 7/1981 | Ladin | 192/98 |

FOREIGN PATENT DOCUMENTS

| 2429385 | 1/1975 | Fed. Rep. of Germany | 192/98 |
| 2935079 | 3/1981 | Fed. Rep. of Germany | 192/99 S |
| 1342911 | 10/1962 | France | |
| 1350298 | 3/1963 | France | |
| 1403829 | 5/1964 | France | |
| 539689 | 9/1941 | United Kingdom | 192/99 S |
| 888336 | 1/1962 | United Kingdom | 192/99 S |

Primary Examiner—Rodney H. Bonck
Attorney, Agent, or Firm—Charles E. Brown; Charles A. Brown

[57] ABSTRACT

A clutch release yoke for a clutch release bearing comprises a region of articulation by means of which said yoke is adapted to be pivotally operated in an operating plane under the control of a control arm, and an active region by means of which it is adapted to act axially in another plane, on the clutch release bearing. In accordance with the invention, the active region of the clutch release yoke is laterally open and consequently has an overall C-shaped configuration, which allows it to be engaged onto the clutch release bearing by simple transverse swinging thereof in a plane perpendicular to the axis of the release bearing. The clutch release yoke of the invention is particularly applicable to "pulled" clutch release bearings which operate in traction.

24 Claims, 10 Drawing Figures

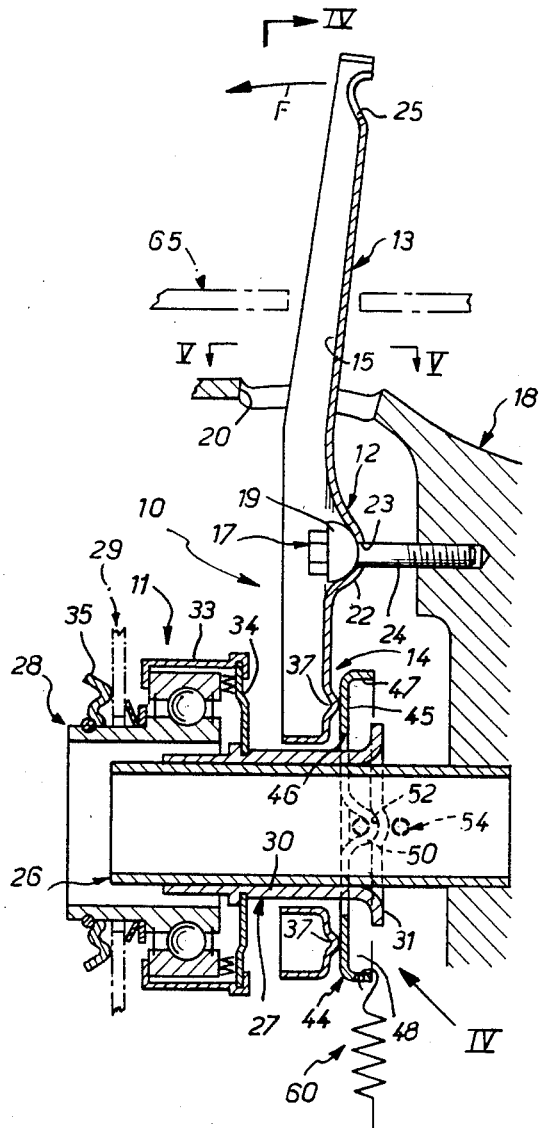
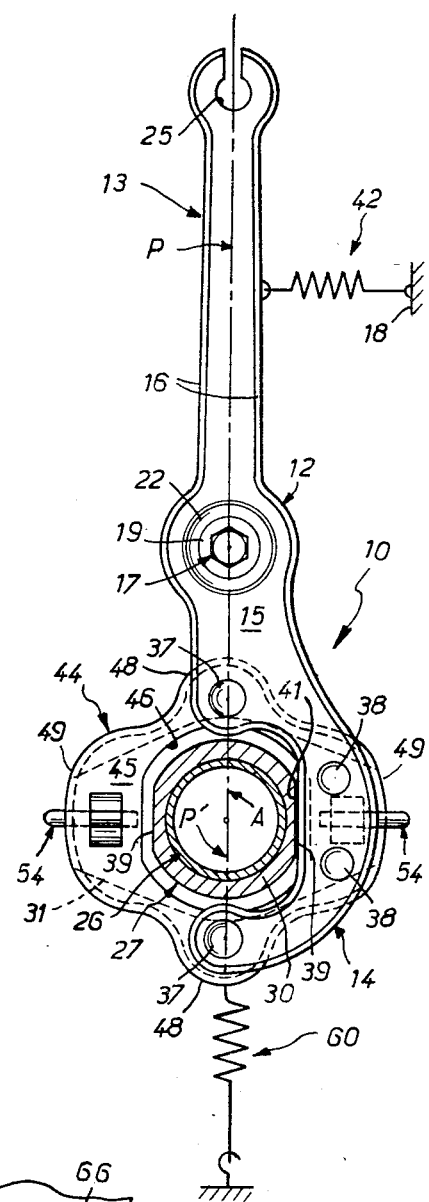
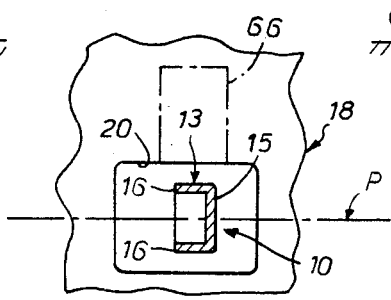
FIG. 3
FIG. 4
FIG. 5

CLUTCH RELEASE DEVICE

BACKGROUND OF THE INVENTION

The present invention relates in general terms to clutch release devices, particularly for motor vehicles.

The term clutch release device used herein is intended to refer to the whole assembly made up by a clutch release bearing and the clutch release yoke or fork adapted to act on it.

In known constructions, the clutch release bearing designed to act on the clutch shift device of a clutch assembly generally consists of an actuating part which acts on the clutch shift device, and an operating part on which the clutch release yoke operates, the actuating part being axially coupled to the operating part, and the operating part including transversely, a flange on which the clutch release yoke acts, this flange optionally being split up into at least two radial arms.

In addition, the clutch release yoke generally includes a region of articulation at which it is adapted to be pivotally operated under the control of a control arm, and an active region or operating portion by means of which it is adapted to act on the clutch release bearing.

The control arm of such a clutch release yoke may for example, be part of the same body as the active region. It would have been manufactured as a one piece structure together with the latter, and, this generally is the case when its support is a ball joint.

Alternatively, the control arm of the clutch release yoke may consist of a part which is separate from the active region and this in practice is the case when its support is constituted by a pivoting shaft. The control arm and active region in this case are able to be mutually spaced from each other along this pivoting shaft and the control arm may even, individually, extend with respect to the shaft at an angular orientation which differs from that of the active region.

Whatever the case may be, the control arm of the clutch release yoke is intended to be linked by a transmission system to a clutch pedal. The active region is adapted to act on the associated clutch release bearing at two points of abutment or contact points which are substantially located at diametrically opposed positions with respect to each other in an axial plane of the clutch release bearing.

At the present time, the points of abutment which are thus present on the clutch release yoke are generally each formed at the respective end of two fingers provided at its active region, so that the latter generally has a U-shaped configuration. The active region is connected at its mid portion to the remainder of the clutch release yoke.

Stated in other terms, because of the opening formed by the gap between these two arms, the active region of the clutch release yoke is open in a direction which, generally, is totally contained within the plane. The plane is perpendicular to the axis about which the clutch release yoke pivots during its operation, and for the sake of simplicity, will be referred to as the plane of pivoting of the clutch release yoke.

In addition, the axial plane of action of the clutch release yoke, which contains its points of abutment is consequently usually perpendicular to its plane of pivoting.

The present invention particularly but not exclusively, concerns the case where the clutch release bearing to be operated is a "pulled" clutch release bearing. A pulled release bearing is one designed to exercise traction on the clutch shift device of the respective clutch mechanism, and has a portion of its actuating part engaged behind said clutch shift device.

In the case of "pulled" clutch release bearings, the flange of the operating part on which the clutch release yoke is designed to act is usually set at a distance from the actuating part, in order for the active region of the clutch release yoke to be able to perform traction on this flange. In other words on the side of the latter which is directed towards the actuating path.

One of the problems to be resolved when assembling such "pulled" clutch release bearings results from the fact that an assembly of this type requires relative engagement of the clutch release bearing and the clutch release yoke. The active region of the clutch release yoke is required to be engaged transversely between, first, the flange provided to allow its operation, on the operating part of the clutch release bearing and, second, the actuating part of the latter.

Stated in other terms, the active region of the clutch release yoke must be engaged behind the transverse flange of the operating part of the clutch release bearing.

Now, as we are here dealing with a "pulled" clutch release bearing, the latter is carried by the actual clutch mechanism with a portion of its actuating part engaged behind the clutch shift device of the latter while the clutch release yoke is, in an independent fashion, usually carried by the housing of a gearbox and being, at its region of articulation, pivotally mounted about a fixed support which can be a transverse shaft or a ball joint, which itself is carried on the housing.

It is consequently necessary when bringing this gearbox housing and the actual clutch, which is usually carried by the housing of the corresponding engine, together in the axial sense, to progressively engage the active region of the clutch release yoke behind the transverse flange of the operating part of the clutch release bearing.

This operation, implying as it does that the clutch release yoke be initially presented substantially flat and lying in a horizontal position and then, by pivoting the clutch release yoke it is progressively returned to the vertical position with the active region gradually becoming engaged behind the transverse flange of the operating part of the clutch release bearing. It is difficult to carry this out in practice, particularly when the clutch release yoke is pivotally mounted on a ball joint.

Moreover, this operation may turn out to be impossible as the pivoting of the clutch release yoke which is necessary to return it to its position requires a significant amount of dead space, which is not always available.

In order to overcome this difficulty, it has been proposed to position the clutch release bearing onto the clutch release yoke before the clutch release bearing is mounted onto the clutch shift device of the clutch concerned, and then, at the time, when the housings of the gearbox and clutch are being brought together, to provide for automatic engagement, under blind conditions, of the clutch release bearing with the clutch shift device of the clutch mechanism.

However, the corresponding provisions for engagement do not readily lend themselves to possible subsequent dis-assembly.

It has also been proposed to engage the clutch release yoke with the clutch release bearing in the transverse sense after the gearbox and clutch housing have been brought together in the axial sense, and consequently, without the prior assembly of this clutch release yoke onto the gearbox and clutch housing.

But, in practice, such a solution is only acceptable when the support for the clutch release yoke on the gearbox housing is external of the latter.

If the support is a ball joint, which is located inside the gearbox housing then it is necessary to provide in the clutch release yoke and in the region of the housing an opening which is suitable for an engagement of this type and usually has a negative effect on the mechanical strength of the clutch release yoke.

It has been proposed, finally, to carry out the assembly by using a pivoting action, of the bayonet or quarter turn type, of the clutch release bearing with respect to the clutch release yoke.

But, in practice, such a solution is only readily applicable to vehicles in which there is easy access to the gearbox housing.

In the case of private passenger vehicles, the necessary space is, on the contrary, not always available.

The present invention, stated in general terms, has the object of providing an arrangement which, while avoiding these disadvantages, makes it possible to overcome the difficulties listed above in a very simple manner.

SUMMARY

Stated more precisely, the object of the invention is first to provide a clutch release yoke or fork for a clutch release bearing, which includes a region of articulation, and which is adapted to be pivotally operated under the control of a control arm, and further includes an active region by which it is adapted to act on a clutch release bearing. The clutch release yoke is laterally open, and has an overall C-shaped configuration. The clutch release yoke is characterised by its active region being open laterally in a direction which is no longer generally contained in its plane of pivoting, as is the case of conventional clutch release yokes of the type presently known, the conventional clutch release yoke is generally perpendicular to such a plane of pivoting.

In accordance with the invention, the axial plane of action in which the points of abutment or contact points adapted to act on the clutch release bearing are located is no longer generally orthogonal to the plane of pivoting of the clutch release yoke, but is on the contrary merged with the plane of pivoting.

Actually, in U.S. Pat. No. 2,260,770, which moreover relates not to a clutch release yoke adapted to act on a clutch release bearing, but rather to an operating lever designed for direct operation of a clutch, a control fork has been proposed with the active region of which is open laterally and has a generally C-shaped configuration.

But the clutch control fork of U.S. Pat. No. 2,260,770 is illustrated as pivoting in its plane, transversely with respect to the axis of the whole assembly, in order to provide for engagement with the clutch which it controls. The control fork is open laterally in a direction which is contained in its own plane, and consequently in its plane of pivoting which is the same as conventional clutch release yokes for a clutch release bearing. That type clutch release yoke is not as the case in this present application, which requires a direction which is orthogonal to this plane.

Moreover, in order for the control fork of U.S. Pat. No. 2,260,770 to act on the clutch which it controls, the active region of this clutch control fork is made up by a cam, which is not the case in this present application.

Finally, U.S. Pat. No. 2,260,770 has no bearing whatsoever on the problem of relative engagement between a clutch release bearing carried by a clutch and a clutch release yoke carried by a support which itself is carried by a housing of a gearbox.

The present application, on the other hand, provides a solution to this problem.

In accordance with the invention the active region of the clutch release yoke is further characterized by being connected to the remainder thereof by one of its ends, in the region of the corresponding point of abutment, so that it only includes one single finger. This arrangement provides a clutch release yoke which when assembled on to the associated clutch release bearing may be done with ease, by lateral engagement with the clutch release bearing.

The present invention further relates to such a method of assembly.

The method of assembly is consequently suitable for providing relative engagement of, first, a clutch release bearing which is carried by a clutch assembly and is intended to be controlled using displacement along the axis of the clutch assembly, and second a clutch release yoke carried by a support carried by the housing of a gearbox. The clutch release yoke has an active region by means of which it is adapted to act axially on the clutch release bearing. During a first stage of assembly, while the clutch assembly and the housing are axially spaced from each other, the active region of the clutch release yoke is arranged in such a fashion that the active region is displaced transversely along the path which the clutch release bearing is to follow during relative axial bringing together of the clutch assembly and the housing. During a second stage of assembly after the bringing-together has been completed, the clutch release yoke is acted on in such a fashion that its active region comes into engagement with the clutch release bearing.

For example, where a release yoke is used having a support in the form of a ball joint, the release yoke is caused to pivot about the ball joint, in a plane which is substantially perpendicular to the axis of the clutch release bearing.

Alternatively, when a release yoke is used having a support in the form of a pivot shaft, the release yoke is displaced parallel to the axis of the shaft.

In both such cases, engagement of the clutch release yoke on to the clutch release bearing does not present any difficulties, even where space is very restricted.

The present invention also has the object of providing a clutch release device of the type stated above, characterised in that the clutch release yoke has an active region which is the generally C-shaped configuration referred to above.

Preferably, such a clutch release yoke has associated with it and incorporated in the associated clutch release device, a force distribution body which is inserted between its active region and the associated clutch release bearing.

In fact, the points of abutment by means of which the active region of the clutch release yoke is adapted to act on the associated clutch release bearing are no longer disposed at the same distance from the region of articulation of the clutch release yoke of the invention, as is the case with conventional clutch release yokes. Instead, the points of abutment are at different distances, by virtue of the points of abutment being radially staggered with respect to this region of articulation. The result is that, in accordance with the invention, these points of abutment have with respect to each other and when operating, different paths when the clutch release yoke pivots.

The force distribution body provided as an additional feature in accordance with the invention makes it possible to obviate the consequences of a differential path of the points of abutment of the release yoke. The force distribution body acts in this respect somewhat like a compensating bar.

In practice, in order to act on the clutch release bearing, the force distribution body is preferably in the form of a plate having a generally cruciform contour which favours minimal lateral displacement of the clutch release yoke when assembling the complete assembly. The plate bears on the associated clutch release bearing at two rounded abutment points which for example are cylindrical. The abutment points are substantially arranged at diametrically opposed positions with respect to each other and are circularly alternate with the points of abutment of the active region of the clutch release yoke.

For example, each of the points of abutment of the force distribution body in accordance with the invention is engaged in a complementary housing provided for this purpose on the clutch release bearing. By using its own points of abutment, the active region of the clutch release yoke is in simple abutment against the force distribution body, and without any connection therewith, so as to provide for radial sliding of the release yoke during its pivoting in service.

As a variation, the force distribution body bears on a plane surface of the clutch release bearing and, by using its active region the clutch release yoke is linked to the force distribution body by engaging means which come into operation at the end of the fitting-together operation of the complete assembly.

Whatever the case may be, in order to facilitate assembly, the force distribution body is preferably harnessed in the axial sense to the associated clutch release bearing using, for example, clamps, clips, or resilient pins, and at the time of assembly, consequently constitutes a unitary sub-assembly with the latter.

The present invention also has the object of providing a clutch release bearing thus fitted with such a force distribution body.

This clutch release bearing is of the type which comprises an operating part on which a clutch release yoke acts, and an actuating part which acts on the clutch shift mechanism of a clutch assembly. The actuating part is axially coupled to the operating part, and the operating part includes a transverse flange spaced from the actuating part upon which the clutch release yoke acts. A force distribution body is fitted onto the flange at the side of the latter and directed towards the actuating part.

BRIEF DESCRIPTION OF THE DRAWINGS

FIG. 3 is a view in axial section of the clutch release device made up by the clutch release yoke and associated release bearing and by the corresponding housing;

FIG. 4 is a view in transverse section of the clutch release device along line IV—IV in FIG. 3;

FIG. 5 is a partial view in section of the clutch release device taken along the line V—V in FIG. 3;

DESCRIPTION OF THE PREFERRED EMBODIMENTS

Figure 1:
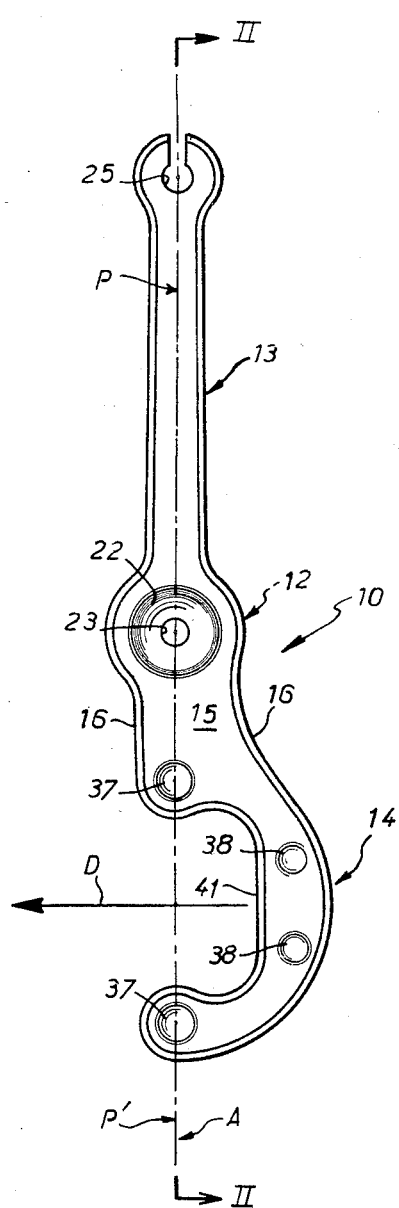
FIG. 1 is an elevational view of a clutch release yoke for a release bearing, in accordance with the invention.
Figure 2:
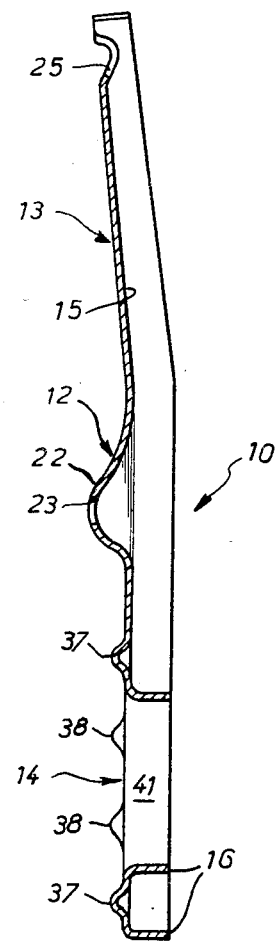
FIG. 2 is a view in axial section of the clutch release yoke along line II—II in FIG. 1.

As illustrated in these Figures, and in a manner known per se, a clutch release yoke 10 for a release bearing 11 in accordance with the invention generally includes a region of articulation 12 by means of which it is adapted to be pivotally operated under the control of a control arm 13, and an active region 14, by means of which it is adapted to act on the associated release bearing 11.

In the embodiment shown in FIGS. 1 to 7, the control arm 13 is in one piece with the active region 14, the complete body having been for example formed, in the manner in which it is shown, from the same suitably pressed blank.

In practice and in a manner known per se the clutch release yoke 10 thus formed generally has a transverse channel-shaped profile, with a base 15 and two lateral sides 16.

In the embodiment shown in FIGS. 1 to 7, the clutch release yoke 10 is designed, using its region of articulation 12, to be carried by a support 17, see FIG. 3, which is also carried by the housing 18 of a gearbox, not shown in detail, and allows pivoting of the clutch release yoke and forms a ball joint 19.

In practice, in the embodiment shown, the support 17 is arranged inside the housing 18 and, by means of the control arm 13, the clutch release yoke 10 projects out from the housing 18 through an opening 20 formed in the housing 18.

In order to cooperate with the ball joint 19 forming the support 17, the region of articulation 12 of the clutch release yoke 10 includes, pressed into its base 15, a raised portion 22 which matches the shape of the ball joint 19, and a passage 23 which allows the shaft 24 of support 17 to pass there through. In practice a bolt may be used.

At its free end, the control arm 13 of the clutch release yoke 10 is provided with a passage 25 which is adapted to be coupled up to a transmission system, such as, for example, a system of rods which is not shown. This in its turn being coupled to a clutch pedal, which also is not shown.

In service, and under the effect of a force supplied to the clutch pedal, the control arm 13 of the clutch release arm 10 is adapted to pivot in a plane, which is the plane of FIG. 3, and which, indicated by the reference P, has been shown in dashed lines in FIGS. 1 and 4.

The plane P, which it will be appropriate to refer to here as the plane of pivoting of the control arm 13, is the plane which is perpendicular to the axis of pivoting of the clutch release yoke 10 and is the general direction in which the control arm 13 moves.

In the embodiment shown in FIGS. 1 to 7, the plane P passes through the center of the passage 25 of the control arm 13 and through the passage 23 in the clutch release yoke 10 and consequently merges with the plane of pivoting P' of the latter. The plane P is perpendicular to the axis of pivoting of the clutch release yoke 10, and contains the general direction of the clutch release yoke.

In practice, the plane of pivoting P' of the clutch release yoke 10, which is shown in dashed lines by a trace in FIGS. 1 and 4, together with the plane of pivoting P of the control arm 13, contains the axis E of the associated release bearing 11.

In order to provide for guiding of the control arm 10 when it is performing its pivoting movements, the opening 20 in the housing 18, which is generally rectangular, is elongated in accordance with the plane of pivoting P, see FIG. 5.

The clutch release bearing 11 will not be described in full detail here. Only those constructional details will be explained which are necessary to understand the invention. The other constructional details of the release bearing are well known per se and do not constitute part of the present invention.

Considered as a whole, the clutch release bearing 11 consists of an operating part 27, on which the clutch release yoke 10 is able to act, and an actuating part 28, which acts on the clutch shift device 29 of a clutch mechanism which is not shown.

The clutch shift device 29 has only been partially shown in dashed lines in FIG. 3.

It may for example involve the use of the radial arms of a diaphragm.

In the embodiment shown, the operating part 27 of the clutch release bearing 11 includes a sleeve 30 by means of which the release bearing 11 is mounted so as to be slidable in the axial sense on a guiding support 26.

The guiding support 26, which is carried by the housing 18, usually forms the "trumpet" surrounding the input shaft of the gearbox.

The operating part 27 of the release bearing 11 further includes a flange 31 lying transversely and at a distance from the actuating part 28 and on which the clutch release yoke 10 is able to act. This can generally be reduced to two arms 32 arranged at substantially diametrically opposed positions with respect to each other.

The actuating parts 28 of the release bearing 11 are axially linked to the operating part 27 of the same by a casing 33 engaged with a flange 34 provided on the sleeve 30 of the operating part 27.

As we are here dealing with a "pulled" clutch release bearing 11, the actuating part 28 of the release bearing 11 extends, with respect to the flange 31 of the associated operating part 27, beyond the clutch shift device 29, and has engaged behind the clutch shift device 29, a part 35 by means of which it is adapted to bear on the face directed away from flange 31, of the clutch shift device 29.

In order to act on the release bearing 11 in a sense which tends to bring it close to the front wall of the adjacent housing 18, the clutch release yoke 10 is, at its active region 14, engaged transversely on the release bearing 11, first between the flange 31 of its operating part 27, and secondly, its actuating part 28.

In accordance with the invention, the active region 14 of the clutch release yoke 10 is, for this purpose, laterally open in a direction which, shown by an arrow D in FIG. 1, is generally orthogonal to the plane of pivoting P' of the clutch release yoke 10. The active region 14 has an overall C-shaped configuration suitable to allow it to be engaged transversely on the sleeve 30 of the operating part 27, covering substantially over a half-circumference of the latter.

In other words, from the region of articulation 12, up to its active region 14, the clutch release yoke 10, in accordance with the invention has the general shape of a sickle.

In the embodiment shown in which the control arm 13 extends in a substantially rectilinear fashion, perpendicular to the axis of the clutch release yoke 10 in service, the direction along which the active region 14 of the yoke 10 is laterally open is orthogonal to that of the control arm 13.

In practice, to provide for action on the release bearing 11 at two substantially diametrically opposed points, the active region of the clutch release yoke 10 includes two abutment points 37, which will be referred to here for the sake of convenience as main abutment points.

These main abutment points 37 are arranged in an axial plane of the release bearing 11, which will here be referred to for the sake of convenience as the axial plane of action.

In accordance with the invention, the axial plane of action, which has been shown in dashed lines by the trace bearing the reference A is parallel to the plane of pivoting P of the control arm 13.

In practice, in the embodiment illustrated in FIGS. 1 to 7, the axial plane of action A merges with the plane of pivoting P' of the clutch release yoke 10.

Thus, in accordance with one characteristic of the invention, the main points of abutment 37 of the clutch release yoke 10 are staggered radially with respect to each other in the plane of action A of the release bearing 11, with respect to the region of articulation 12.

Stated in other terms, they are at differing distances from the region of articulation 12.

Thus, as will be seen, in accordance with a further characteristic of the invention, the active region 14 of the clutch release yoke 10 is linked to the remainder of the release bearing 11 at one of its ends in the region of the main points of abutment 37 which is closest to the region of articulation 12. The active region 14, considered as a whole, only possesses one single finger, which is bent around in a semi-circle.

In the embodiment shown, each one of the main points of abutment 37 of the clutch release yoke 10 is a raised portion in the form of a spherical dome pressed into the base 15.

The axis of the raised portion lies in principle in the axial plane of action A.

However, in order to overcome the consequence of a possible misalignment with respect to the plane of action A, the axis of the raised portion may be slightly offset in the transverse sense with respect to the latter, that is in a direction directed away from the mid portion of the active region 14. Thus, between the main abutment point 37 and for acting on the release bearing 11, there is provided at least one supplementary point of abutment 38, which will be referred to here for convenience as an auxiliary point of abutment.

In the embodiment shown, two auxiliary points of abutment 38 are provided, which are each respectively arranged on one and the other side of the axial plane of the clutch release bearing 11, which is perpendicular to the axial plane of action A and in the region of the latter.

In practice, to provide for guiding of the clutch release yoke 10 while it is pivoting and for maintaining the angular position of the sleeve 30 of the operating part 27 of the release bearing 11, the sleeve 30 is provided, laterally and parallel to the axis of the release bearing 11, with a guide face 39 against which, in the mid portion of the active region 14, the clutch release yoke 10 is adapted to come into contact and cooperate therewith. The mid portion has, for this effect, an appropriate bearing surface, for example a flat.

In the embodiment shown, the bearing surface is formed by a rectilinear portion 41 present locally on the corresponding arm 16 of the clutch release yoke 10.

Together with this provision, a spring 42 is attached at one end to the control arm 13 and at the other end to the the clutch release yoke 10 into contact with the guide face 39 of the sleeve 30 of operating part 27 of the release bearing 11.

In practice, for reasons of symmetry, the sleeve 30 has two guide faces 39, which are each arranged at respective diametrically opposed positions with respect to each other.

In the clutch release device comprising a clutch release yoke 10 and a clutch release bearing 11, a force distribution body 44 is preferably associated with the clutch release yoke 10, as shown, and it is inserted axially between the active region 14 of the clutch release yoke 10 and the release bearing 11 at the flange 31 of the operating part 27 of the release bearing 11.

In the embodiment shown, the force distribution body 44 has the general shape of a plate 45. The plate 45 is cut out in its central region so as to provide an opening 46 to freely surround the sleeve 30 of the operating part 27 of the release bearing 11. At the periphery of the plate 45 is an axial lip 47.

In practice, and for reasons which will become clear from what follows, the contour of the force distribution body 44 is generally cruciform in shape. The force distribution body 44 forms in the plane of action A of the clutch release yoke 10, two arms 48 and, perpendicular to this plane, two arms 49.

In order to act on the clutch release bearing 11, the force distribution body 44 bears at two rounded points of abutment 50 on the flange 31 of the operating part 27 of the release bearing 11.

These points of abutment 50 of the force distribution body 44 are substantially provided at diametrically opposed positions on the arms 49, and alternate in the circular sense, subhstantially at 90° in the embodiment shown, with the main points of abutment 37 of the active region 14 of the clutch release yoke 10.

In practice, the points of abutment 50 of the force distribution body 44 are formed by slashes which are formed for this purpose on the plate 45. Each one of the points of abutment 50 is pressed in the form of a generally cylindrical trough projecting from the plate 45.

In the embodiment illustrated in FIGS. 1 to 7, the force distribution body 44 is, at each of its points of abutment 50, engaged in a complementary housing 52 provided for this purpose on the flange 31 of the operating part 27 of the release bearing 11. Further, the main abutment points 37 of the active region 14 of the clutch release yoke 10 are in simple abutment against the force distribution body 44.

Preferably, and in order to facilitate fitting together of the complete assembly, the force distribution body 44 is, as is shown, axially harnessed to the clutch release bearing 11.

For example, and as has been shown, an assembly clamp 54 is associated with each one of the points of abutment 50 and is in the form of a suitably shaped pin.

At one of the pin's ends 55, which has been passed through the lip 47 of the force distribution body 44, by engagement with a passage 56 formed in the lip 47. Thus the pin 54 is engaged between the upset portion forming the corresponding point of abutment 50 and the plate 45 constituting a force distribution body 44 of this type.

Figure 6:
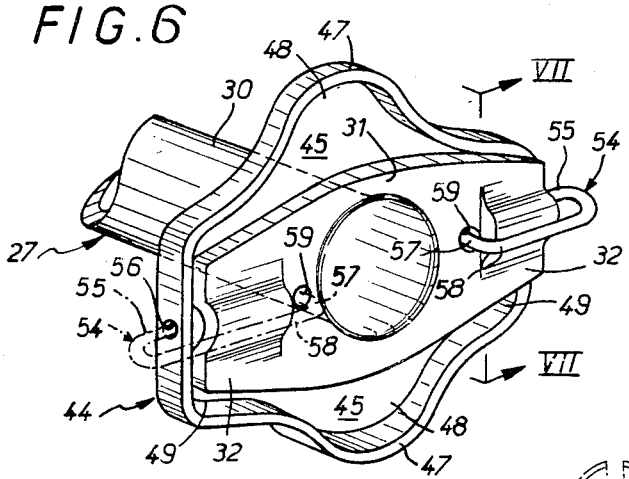
FIG. 6 is a partial view in perspective and seen from behind in accordance with arrow VI in FIG. 3, of the clutch release bearing incorporated in the clutch release device.
Figure 7:
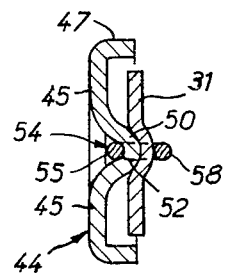
FIG. 7 is a partial sectional view of the clutch release bearing along line VII—VII in FIG. 6.

Moreover, by using an end 57 constituting a right-angle return path of a branch 58, which is parallel to the end 55 referred to above, the pin 54 is behind the flange 31 of the operating part 27 of the clutch release bearing 11, with the end 57 engaged in a passage 59 provided in the flange, see FIG. 6.

Angular location of the clutch release bearing 11 on its guide support 26 can, for example, and as is shown in FIG. 3, be provided by a spring 60 which is attached at one end to the lip 47 of the force distribution body 44, and, at the other end, to a fixed point belonging, for example, to the associated engine housing or to a tab carried by the latter.

As a variant, assembly of the sleeve 30 of the operating part 27 of the clutch release bearing 11 onto its guide support 26 can be a splined assembly.

Whatever the case may be, the clutch release bearing 11, which is designed to be controlled so as to move in accordance with the axis of the clutch mechanism with which it is associated, is initially carried by the clutch shift device 29, when the clutch assembly is brought in the axial sense towards the gearbox housing 18.

In accordance with the invention, during a first stage, while the clutch assembly and the housing 18 are still axially spaced from each other, the clutch release yoke 10 is arranged on the support 17 in such a fashion that the active region 14 is displaced transversely from the path along which the clutch release bearing 11 is to follow during relative axial bringing-together of the clutch assembly and the housing 18, or in other words displaced from its final position.

In practice, when dealing with a clutch release yoke 10, the support 17 of which forms a ball joint 19, the clutch release yoke 10 is caused to swing about the ball joint 19 in a plane which is substantially perpendicular to the axis of the clutch release bearing 11.

Figure 8:
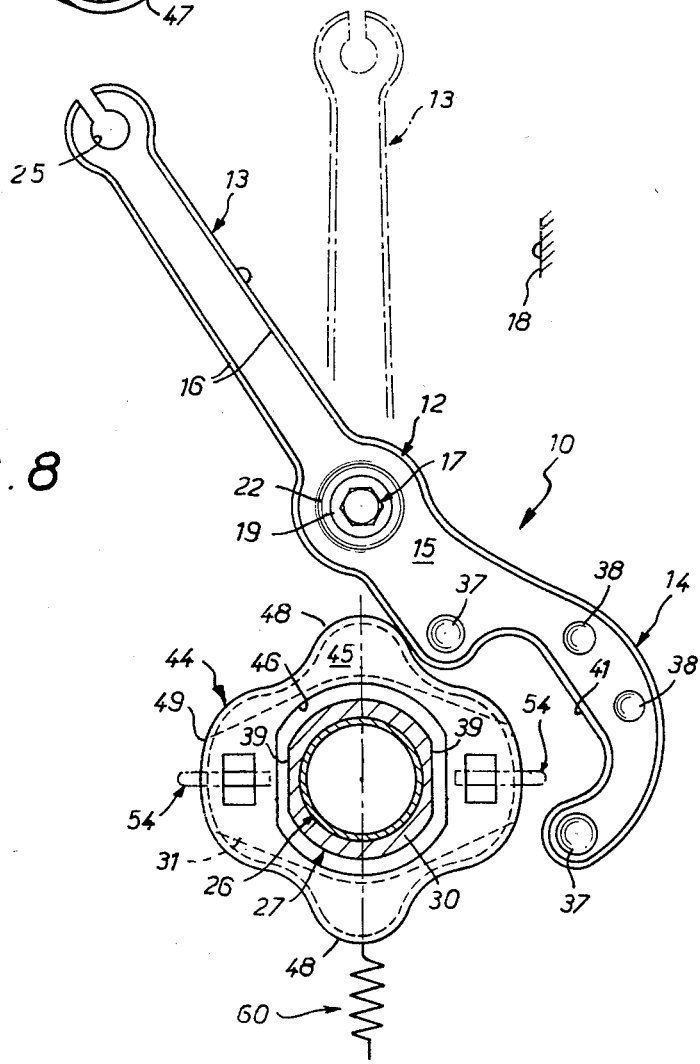
FIG. 8 is a similar view to that of FIG. 4, illustrating assembly of the clutch release yoke in accordance with the invention.

The clutch release yoke 10 then occupies, prior to relative axial bringing together of the clutch mechanism and the housing 18, the displaced position as shown by solid lines in FIG. 8.

Then, during a second stage, when the bringing-together of the clutch mechanism and the housing 18 has been completed, the force distribution body 44 has passed beyond the position of the clutch release yoke 10, in the direction of the adjacent transverse wall of the housing 18. The clutch release yoke 10 is acted on in such a fashion that its active region 14 comes into engagement with the clutch release bearing 11.

As in this case we are dealing with a clutch release yoke 10 the support 17 of which forms a ball joint 19, it is simply a matter of swinging the clutch release yoke 10 in a plane perpendicular to the axis of the clutch release bearing 11.

Then, the spring 42, lying transversely is attached and permanently urges the active region 14 towards the axis of the clutch release bearing 11. The flat rectilinear portion 41 of the inwardly located arm 16 is applied against the axial guide face 39 of the sleeve 30 of the operating part 27 of the clutch release bearing 11.

During the swinging operation it is necessary for the clutch release yoke 10 to become fitted in place, and thus when the opening 20 in housing 18 is a wide opening there is provided a template 65, which is shown diagrammatically in dash lines in FIG. 3. The template 65 is temporarily located over such an opening 20.

As a variation, see FIG. 5, when the opening 20 in the housing 18 is itself too narrow to allow such swinging to occur, a cut out portion 66 can be provided in the housing 18 which extends into the opening 20. This permits temporary swinging to occur, and then the cut out portion 66 closed off by, for example, fitting a plate onto the housing 18.

Whatever the case may be, in service, the clutch release yoke 10 bears, at least at the main points of abutment 37 of the active region 14, on the force distribution body 44, on the two arms 48 of the latter which are elongated and follow the axial plane of action A.

As a result of the staggering, referred to above, of the main points of abutment 37 with respect to the axial plane of action A, it moreover bears on the force distributing body 44, using at least one of its auxiliary points of abutment 38.

It is, in fact, ensured that, as a result of this staggering, swinging to which the clutch release yoke may be subject resulting from the transmission system to which it is connected, about the intersection of its axial plane of action A and its base 15, of necessity brings at least one of these auxiliary points of abutment 38 to bear against the force distribution body 44.

During the pivoting which occurs in service of the clutch release yoke 10 necessary to exercise traction on the clutch release bearing 11, in accordance with arrow F in FIG. 3, the force distribution body 44 swings about an axis which is perpendicular to the axial plane of action A. This is materialised in practice by the ends 55 of its fitting clamps 54 for compensating the difference in the paths along which the main points of abutment 37 of the clutch release yoke 10 follow by virtue of their differing distances from the corresponding region of articulation 12.

In conjunction with this, during this pivoting under operating conditions of the clutch release yoke 10, the latter slides radially in contact with the force distribution body 44.

Hence, it will be seen that it is by means of a plane surface of the force distribution body 44 that the clutch release yoke 10 bears on the latter.

Figure 9:
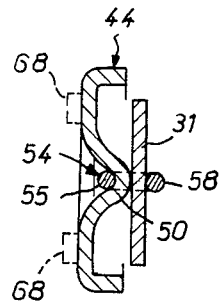
FIG. 9 is a similar view to that of FIG. 7 and concerns one alternative embodiment.

In accordance with the alternative embodiment diagrammatically shown in FIG. 9, the points of abutment 50 of the force distribution body 44 also bears on a plane surface of the clutch release bearing 11, which is made up in practice by the linear portion of the flange 31 of the operating part 27 thereof, and, together with this, at its active region 14, the clutch release yoke 10 is linked to the force distribution body 44.

For example and as is shown in dashed lines 68 in FIG. 9, engaging means may be provided between the clutch release yoke 10 and the force distribution body 44. The engaging means comes into action during assembly of the clutch release yoke 10 at the end of the transverse swinging action when the clutch release yoke 10 moves towards the axis of the clutch release bearing 11, and thus linking the clutch release yoke 10 to the force distribution body 44.

In such an alternative embodiment, the force distribution body 44 not only pivots in contact with the flange 31 of the operating part 27 of the clutch release bearing 11, when the clutch release yoke 10 pivots, as was the case above, but additionally, slides in contact with the flange 31.

On the other hand, no relative sliding motion is now developed between the clutch release yoke 10 and the force distribution body 44.

Figure 10:
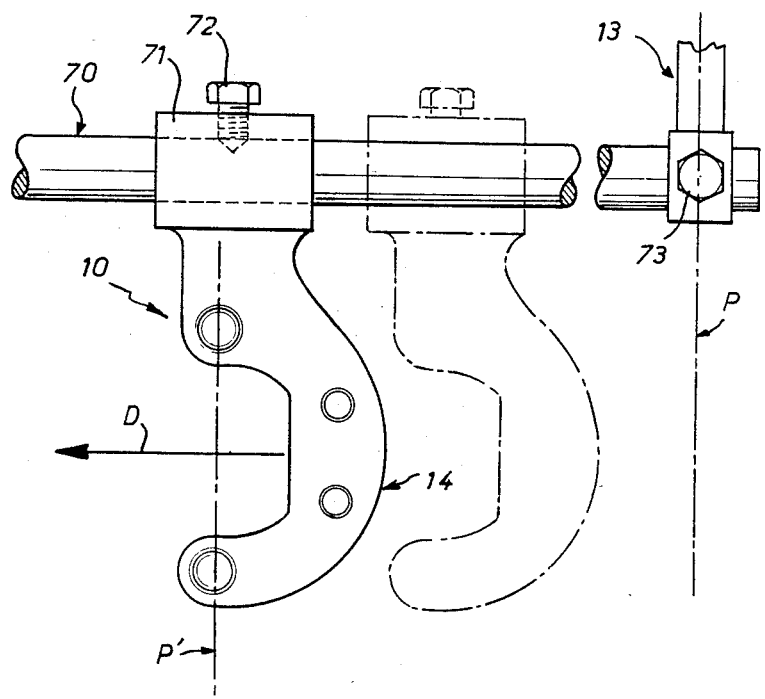
FIG. 10 is a similar view to that of FIG. 1 and concerns a further alternative embodiment.

FIG. 10 illustrates application of the invention to the case where the support for the clutch release yoke 10 is a pivot shaft 70.

Using a sleeve 71 slidably engaged on such a pivot shaft 70, the clutch release yoke 10 is, and subject to regulation by a pointed screw 72, adjustable in position along the pivot shaft 70.

In this case, the control arm 13 of the clutch release yoke 10 may, as is shown, be located on the pivot shaft 70 at a certain distance from the clutch release yoke 10, and optionally with an angular orientation which differs from that of the release yoke on the shaft using regulation provided by a pointed screw 73.

In a case of this type, the plane of pivoting P of the control arm 13 differs from that, P′ of the clutch release yoke 10, while still being parallel to the latter.

However, the other provisions remain identical to those described above, the active region of the clutch release yoke, having, in particular, a C-shaped configuration and being open in a direction D which is orthogonal with respect to the plane of pivoting P′ of the clutch release yoke 10.

In accordance with the invention, in order to fit the assembly together, the clutch release yoke 10 is displaced parallel to the axis of its pivot shaft 70, from a spaced position, shown by dashed lines in FIG. 10, at which it allows relative axial bringing-together of the clutching mechanism carrying the clutch release bearing and of the housing 18, to a final service position, represented in full lines in FIG. 10 at which it is now in engagement, in the transverse sense, with this clutch release bearing 11, with contact between its actuating part 28 and the force distribution body 44 which it carries.

In all these cases, using the assembly clamps or other linking bodies, the force distribution body 44 preferably constitute part of the clutch release bearing 11 in order to facilitate its handling and assembly, as described above.

In all cases as well, the force distribution body preferably has the cruciform shape as explained above, in order to present, between its arms an opening which minimises, during assembly transverse swinging of the clutch release yoke necessary for its passage.

The present invention is moreover not limited to the embodiments which have been described and represented but also covers any alternative embodiments within the scope of the appended claims.

In particular, the control arm associated with the clutch release yoke in accordance with the invention is not necessarily rectilinear and/or perpendicular to the axis of pivoting of said clutch release yoke in service; it may for example, be elbowed or oblique.

Furthermore in order to maintain the angular position of the sleeve of the operating parts of the clutch release bearing, the means provided for this purpose may be made up by at least one lug, which, being carried by the associated force distribution body, cooperates in abutting fashion with the edge of the clutch release yoke.

I claim:

1. A clutch release fork for a clutch release bearing comprising means for pivotally mounting said release fork for pivotal movement generally in a plane under the action of a control arm, said release fork in its entirety having a single operating portion adapted to cooperate with a clutch release bearing, said single operating portion having an overall C-shaped configuration and being laterally open in a direction generally perpendicular to the plane of pivotal movement, means for mounting said release fork for transverse displacement between a first, assembly operation position in which said operating portion is transversely offset relative to said plane of movement and a second, operative position in which said release fork is adapted to cooperate with the clutch release bearing and pivot in said plane of pivotal movement.

2. A clutch release fork in accordance with claim 1, wherein said operating portion is laterally open in a direction generally at right angles with respect to said control arm.

3. A clutch release fork in accordance with claim 2, wherein said control arm is integral with said operating portion, said control arm and said operating portion being disposed on opposite sides of said means for pivotally mounting said clutch release fork.

4. A clutch release fork in accordance with claim 1, in which said operating portion has two main contact points for cooperating with the release bearing, said main contact points being situated at substantially diametrically opposed positions of said C-shaped configuration and lie in an axial plane of action, said axial plane of action substantially coinciding with said plane of pivotal movement of said clutch release fork.

5. A clutch release fork in accordance with claim 4, wherein said main contact points of said operating portion are at different radial distances from said means for pivotally mounting said release fork.

6. A clutch release fork in accordance with claim 4, wherein said operating portion is joined to the remainder of said clutch release fork at one of its end proximate to one of said main contact points whereby said fork operating portion defines a single finger.

7. A clutch release fork in accordance with claim 4, wherein said main contact points of the operating portion are slightly transversely offset with respect to said axial plane of action, in a direction away from an intermediate portion of said C-shaped operating portion.

8. A clutch release fork in accordance with claim 4, wherein said C-shaped operating portion has at least one auxiliary contact point located between said main contact points.

9. A clutch release fork in accordance with claim 8, wherein two said auxiliary contact points are provided, said auxiliary contact points being located respectively on opposite sides of an axial plane perpendicular to said axial plane of action, intersecting said operating portion.

10. A clutch release fork in accordance with claim 1, wherein said operating portion includes, on its internal contour, a guiding surface adapted to co-operate with a generally planar axial guide face provided on the associated clutch release bearing, said guiding surface being arranged in an intermediate portion of said C-shaped operating portion.

11. A clutch release fork in accordance with claim 1, wherein said means for pivotally mounting said release fork comprises a ball joint, said ball joint also defining said means for mounting said release fork for transverse displacement, the transverse displacement being in a plane substantially perpendicular to said plane of pivotal movement.

12. A clutch release fork in accordance with claim 1, wherein means for pivotally mounting said release fork comprises a pivotal shaft, and said means for mounting said release fork for transverse displacements being defined by said pivot shaft mounted for displacement along its axis.

13. A clutch release fork in accordance with claim 1, together with a gearbox housing, wherein means for guiding said clutch release fork in its transverse displacement is provided, said means including a cut-out portion in the gearbox housing.

14. A clutch release fork in accordance with claim 1, wherein means for guiding said clutch release fork in its transverse displacement is provided and includes a guide member adapted to surmount a housing for an associated gearbox.

15. A clutch release bearing and fork arrangement comprising a clutch release bearing mounted for axial movement along an axis, a clutch release fork, means for pivotally mounting said release fork for pivotal movement generally in a plane containing said axis under the action of a control arm, said release fork in its entirety having a single operating portion adapted to cooperate with said clutch release bearing, said single operating portion having an overall C-shaped configuration and being laterally open in a direction generally perpendicular to the plane of pivotal movement, means for mounting said release fork for transverse displacement between a first assembly operation position in which said operating portion is transversely offset relative to said clutch release bearing and a second operative position in which said release fork is cooperable with said clutch release bearing for moving said clutch release bearing along said axis.

16. A clutch release bearing and fork arrangement in accordance with claim 15, further comprising a force distribution member co-axial with said release bearing and interposed between said operating position and said clutch release bearing.

17. A clutch release bearing and fork arrangement in accordance with claim 16 wherein said operating portion has two main contact points for coacting with said clutch release bearing, said main contact points being situated at substantially diametrically opposed positions of said C-shaped configuration and lie substantially in an axial plane of action coinciding with said plane of pivotal movement of said clutch release fork, said force distribution member bearing on said clutch release bearing through two rounded contact points arranged diametrically opposite each other and alternating around said axis with said main contact points.

18. A clutch release bearing and fork arrangement in accordance with claim 19, wherein each of said rounded contact points of said force distribution mean is engaged in a complementary housing provided on said clutch release bearing, said main contact zones of said operating portion being in simple bearing contact against said force distribution member.

19. A clutch release bearing and fork arrangement in accordance with claim 17, wherein said said rounded contact points of force distribution member bear on a plane surface of said clutch release bearing, and said force distribution member being connected to said operating portion.

20. A clutch release bearing and fork arrangement in accordance with claim 16, wherein said force distribution member is axially connected to said clutch release bearing.

21. A clutch release bearing and force arrangement in accordance with claim 16, wherein said force distribution member comprises a plate having a generally cruciform contour.

22. A clutch release bearing and fork arrangement in accordance with claim 16, wherein the clutch release fork bears against a plane surface on said force distribution member.

23. A clutch release bearing and fork arrangement according to claim 16, wherein said clutch release bearing comprise an operating part operatively connected to said release fork and an actuating member cooperable with a clutch release mechanism of a clutch, said actuating part being axially coupled to said operating part, and said operating part including a transverse flange axially spaced from said actuating part, said force distribution member being fitted on said flange and disposed on the side thereof facing toward said actuating part of said release bearing.

24. A clutch release bearing and fork arrangement in accordance with claim 15, wherein a spring is attached to said clutch release fork, said spring permanently urging said operating portion to its second operative postion.

* * * * *